United States Patent
Lindsay et al.

(10) Patent No.: US 7,687,767 B2
(45) Date of Patent: Mar. 30, 2010

(54) FAST SCANNING STAGE FOR A SCANNING PROBE MICROSCOPE

(75) Inventors: Stuart M. Lindsay, Phoenix, AZ (US); Tianwei Jing, Tempe, AZ (US)

(73) Assignee: Agilent Technologies, Inc., Santa Clara, CA (US)

( * ) Notice: Subject to any disclaimer, the term of this patent is extended or adjusted under 35 U.S.C. 154(b) by 357 days.

(21) Appl. No.: 10/725,769

(22) Filed: Dec. 2, 2003

(65) Prior Publication Data
US 2004/0129873 A1 Jul. 8, 2004

Related U.S. Application Data

(60) Provisional application No. 60/435,518, filed on Dec. 20, 2002.

(51) Int. Cl.
*G02B 26/00* (2006.01)
(52) U.S. Cl. .................. 250/234; 356/500; 356/501
(58) Field of Classification Search .......... 250/234, 250/216, 306–309; 356/904, 501, 500
See application file for complete search history.

(56) References Cited

U.S. PATENT DOCUMENTS

| | | | | |
|---|---|---|---|---|
| 4,906,840 A | * | 3/1990 | Zdeblick et al. | 250/306 |
| 5,051,646 A | | 9/1991 | Elings et al. | 310/317 |
| 5,210,410 A | * | 5/1993 | Barrett | 250/234 |
| 5,371,365 A | * | 12/1994 | Watanabe et al. | 250/306 |
| 5,744,799 A | | 4/1998 | Ohara | 250/307 |
| 5,773,824 A | * | 6/1998 | Flecha et al. | 250/306 |
| 5,805,448 A | | 9/1998 | Lindsay et al. | 250/306 |
| 5,811,796 A | * | 9/1998 | Marchman et al. | 250/234 |
| 5,825,020 A | | 10/1998 | Hansma et al. | 250/216 |
| 6,229,607 B1 | * | 5/2001 | Shirai et al. | 356/614 |
| 6,338,249 B1 | * | 1/2002 | Pai et al. | 60/528 |
| RE37,560 E | * | 2/2002 | Elings | 310/316.01 |
| 6,437,343 B1 | | 8/2002 | Okazaki et al. | 250/442.11 |
| 6,459,088 B1 | * | 10/2002 | Yasuda et al. | 250/442.11 |
| 6,806,991 B1 | * | 10/2004 | Sarkar et al. | 359/290 |
| 2004/0051542 A1 | * | 3/2004 | Miles et al. | 324/754 |

FOREIGN PATENT DOCUMENTS

| | | | |
|---|---|---|---|
| JP | 62105440 A | * | 5/1987 |
| JP | 08285176 A | * | 11/1996 |
| JP | 09054097 A | * | 2/1997 |
| JP | 11 094968 | | 7/1999 |

OTHER PUBLICATIONS

Ando et al., "A high-speed atomic force microscope for studying biological macromolecules", Proc. Natl. Acad. Sci. USA, vol. 98, Issue 22, Oct. 23, 2001, pp. 12468-12472.*
English Translation of JP 62105440 A, Mar. 2007.*
Viani et al., "Fast imaging and fast force spectroscopy of single biopolymers with a new atomic force mcroscope designed for small cantilevers", Review Of Scientific Instruments, vol. 70, No. 11, Nov. 1999, pp. 4300-4303.
Ando et al., "A high-speed atomic force microscope for studying biological macromolecules", Proc. Natl. Acad. Sci. USA, vol. 98, Issue 22, Oct. 23, 2001, pp. 12468-12472.

* cited by examiner

*Primary Examiner*—Georgia Y Epps
*Assistant Examiner*—Tony Ko (57) ABSTRACT

A fast translation stage for a scanning probe microscope is provided. The stage includes at least one axis of translation driven at the natural resonant frequency of the translation stage such that distortion associated with rapid changes in scan direction is avoided. In one embodiment, the stage includes a sample plate or support that is driven, preferably by one or more piezoelectric actuator elements, so that the plate translates along the fast scan frequency at its resonant frequency.

14 Claims, 5 Drawing Sheets

FAST SCANNING STAGE FOR A SCANNING PROBE MICROSCOPE

CROSS-REFERENCE TO RELATED APPLICATIONS

This application claims the benefit of U.S. Provisional Application Ser. No. 60/435,518, filed Dec. 20, 2002.

BACKGROUND OF THE INVENTION

This invention relates to scanning probe microscopy, such as for example, atomic force microscopy or near-field optical microscopy, and more particularly to a fast translation stage for scanning probe imaging that avoids imaging distortion associated with rapid changes of scan direction.

It is highly desirable to increase the speed with which scanning probe microscopes can image, particularly in fluid, in order to permit visualization of processes that occur on timescales comparable to or faster than the imaging rate of conventional scanning probe microscopes. Present commercially-available scanning probe microscopes are limited by natural mechanical resonances so that several seconds or more are required to acquire an image. It would be highly desirable to be able to increase these imaging rates by an order of magnitude or more. In such a case, ten or many tens of images per second could be acquired, giving rise to near-video rate data acquisition.

One of the limiting resonances is associated with the force sensing cantilever itself. The resonant frequency, $f_0$, of a cantilever of effective bending force constant K in Newtons per meter (N/m) and mass m in kilograms (Kg) is given by $$f_0 = \frac{1}{2\pi}\sqrt{\frac{K}{m}}.$$

Because it is desirable to keep the force constant, K, small for imaging soft materials, the route to increasing the resonant frequency lies in making smaller cantilevers so as to reduce their mass m.

Viani et al, "Fast imaging and fast force spectroscopy of single biopolymers with a new atomic force microscope designed for small cantilevers," *Rev. Sci. Instrum.* 70: 4300-4303 (1999), and Hansma et al, U.S. Pat. No. 5,825,020, describe microscopes in which the length of the cantilever is reduced to only a few times the optical wavelength, so that, using special focusing optics as taught in the '020 patent, cantilevers with resonant frequencies of greater than 100 kHz (in water) and with spring constants as small as 0.06 (N/m) can be used. Ando et al, "A high-speed atomic force microscope for studying biological macromolecules," *Proc. Natl. Acad. Sci. (USA)* 98: 12468-12472 (2001), take a similar approach and have reported imaging at greater than 10 frames per second with cantilevers having resonant frequencies of about 500 kHz (in water) and with spring constants of 0.15 to 0.28 N/m.

In practice, another severe limit on scanning speed is dictated by the sample (or probe) scanning stage. In order to fully exploit a cantilever with a 500 kHz resonant frequency, each line scan, sampling typically 100 or more points, would have to be completed in $(5\,kHz)^{-1}$ seconds or 20 microseconds (µs) if a height data point is to be acquired on each cycle of cantilever oscillation.

Figure 1A:
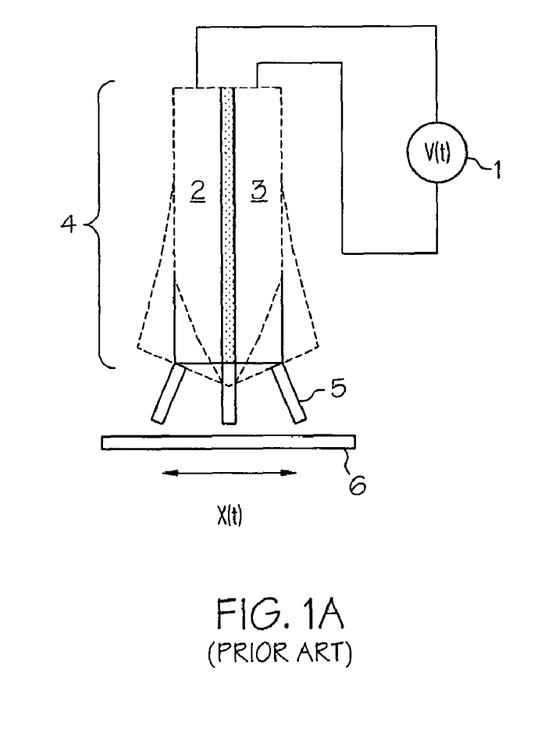
FIG. 1A is a schematic illustration of a prior art scanning element and probe being scanned in a raster fashion over a substrate.
Figure 1B:
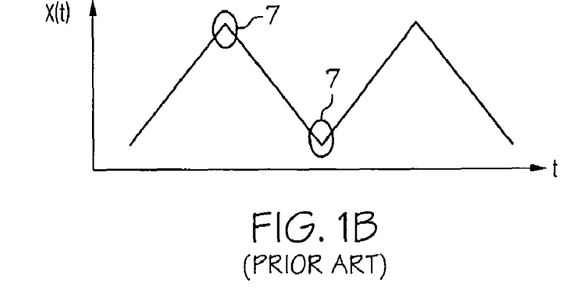
FIG. 1B illustrates a plot of the desired fast-scan direction displacement, X(t) as a function of time (t)

Current practice in scanning probe microscopy includes scanning the probe in a raster pattern over the sample as shown in FIG. 1A. Alternately, the sample may be scanned in a raster pattern under a fixed probe. Considering just the fast scan axis (taken to be the X axis here) and referring to FIG. 1A, a time-varying voltage, V(t) 1, is applied to electrodes 2, 3 on a piezoelectrically driven scanning element 4 so as to cause the element to bend and scan a probe 5 over the surface of a sample 6. The desired motion is a linear sweep of the probe over the surface so that the displacement X(t) varies with time as shown in FIG. 1B.

Figure 1C:
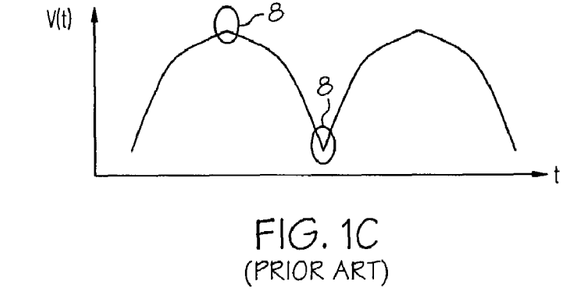
FIG. 1C illustrates a plot of the desired fast scan direction displacement. X(t), as a function of time using a voltage waveform chosen to achieve the displacement.

Because the displacement of a piezoelectric material is not linear with changes of applied voltage, it is usual to apply a non-linear ramp, such as that shown as V(t) in FIG. 1C so that the resultant displacement, X(t), is a linear function of time. See, Eilings, V. B. and J. A. Gurley, U.S. Pat. No. 5,051,646, and Lindsay, S. M. and I. W. Shepherd, "Linear Scanning Circuit for a Piezoelectrically Controlled Fabry-Perot Etalon," *Rev. Sci. Instrum.* 48: 1228-1229 (1977). This approach results in a rapid change of direction at the turning points 7 of the scan where the derivative of the applied voltage changes sign as shown at 8.

Because the velocity of the probe is proportional to the time derivative of the applied voltage, $$\frac{dV(t)}{dt},$$

the momentum change, or impulse applied to the scanning element is proportional to the second derivative $$\frac{d^2V(t)}{dt^2}.$$

This quantity is infinite at the turning points 7 and 8, though in practice it is limited by the time response of the driving electronics. The result is that a sharp impulse is given to the scanning element at the turning points, and this causes the scanning element to ring at its resonant frequency, $f_0^{SCANNER}$.

Figure 1D:
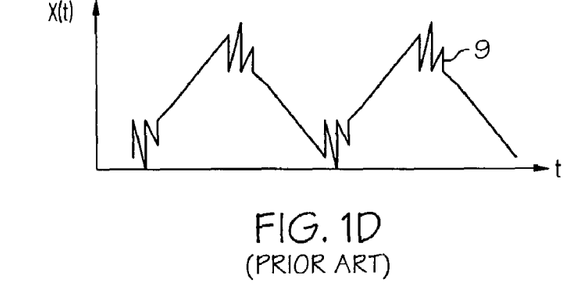
FIG. 1D illustrates a plot of the actual X displacement showing scanning element resonances at the turn around points in the scan.

The ringing continues for approximately $Q/f_0^{SCANNER}$ seconds, where Q is the mechanical Q factor of the scanning element. Because a rapid response is desired from the scanning element, and critical damping is not easy to implement, scanning elements generally have a Q>1. Thus, given a typical scanning element with a resonant frequency of a few kHz and a Q of 5, the ringing motion, 9 in FIG. 1D may continue for 5 or more milliseconds. If, in turn, this distortion is not to affect more than 10% of a scan, the fast scan time is limited to 50 milliseconds or more, which is several hundred times slower than needed to realize the potential speed offered by small (optical wavelength-sized) cantilevers.

One solution to this problem has been proposed by Ando et al, supra, using a balanced pair of scanning elements moving in opposite directions, one scanning the sample stage, and the other scanning a dummy mass. The scanning elements are driven so that the total momentum of the system is always approximately zero. This, however, greatly increases the mass and complexity of the scanning stage and also increases the possibility of spurious resonances in the scanning element.

Accordingly, a need still exists in the art to provide a fast-scanning stage that is free from artifacts associated with any turn-around in scan direction. There is a further need for a scanning stage that can complete fast line scans at a rate of several kHz, and which is free from turn around artifacts.

There is a further need in the art for a scanning stage having scan amplitudes on the order of approximately one micron with small (i.e., less than about one hundred volts) voltages applied to the scanning elements.

SUMMARY OF THE INVENTION

These needs are met by embodiments of the present invention in which a fast translation stage for a scanning probe microscope, such as for example an atomic force microscope, is provided. The stage includes at least one axis of translation driven at the natural resonant frequency of the translation stage such that distortion associated with rapid changes in scan direction is avoided. The stage includes a sample plate or support that is driven, preferably by one or more piezoelectric elements, so that the plate translates along the fast scan frequency at its resonant frequency. This avoids distortion and artifacts at points where the scanning element undergoes a rapid change in scan direction such as at turn-around points. The acquired data is subsequently linearized, for example, using a digital computer.

In accordance with one aspect of the invention, a fast scanning stage for a scanning probe microscope is provided. The microscope includes a probe and the fast scanning stage includes a sample stage having at least one axis of translation and means for causing displacement of the stage relative to the probe. Thus, a sample secured to the stage will also be displaced relative to the probe. A preferred means for causing displacement of the stage comprises at least one actuator element supporting the stage and a sine waveform generator for actuating the at least one actuator element. In a preferred form, the stage includes four actuator elements supporting the stage.

The stage is displaced by being driven at the frequency of resonant vibration corresponding to translation of the sample with respect to the probe. Preferably, the stage has a square or rectangular configuration and each corner of the stage is supported by one of the actuator elements. Preferably, the actuator elements comprise a PZT bimorph material. The stage is preferably comprised of an electrically insulating material such as, for example, ceramics, heat resistant polymers, and anodized aluminum.

The present invention also includes a method of operating a fast-axis scanning stage for a scanning probe microscope including a probe comprising providing a sample stage having a sample thereon and causing displacement of the sample on the stage relative to the probe. In a preferred form, driving the stage at its resonant frequency causes the displacement. The resonant frequency of the stage is preferably about $\frac{1}{100}^{th}$ that of the resonant frequency of the probe.

Accordingly, it is a feature of the present invention to provide a fast-scanning stage that is free from artifacts associated with any turn-around in scan direction. It is a further feature of the invention to provide for a scanning stage that can complete fast line scans at a rate of several kHz, and which is free from turn around artifacts. It is still a further feature of the present invention to provide a scanning stage having scan amplitudes on the order of approximately one micron with small (less than about one hundred volts) voltages applied to the scanning elements. These and other features and advantages of the invention will become apparent from the following detailed description, the accompanying drawings, and the appended claims.

BRIEF DESCRIPTION OF THE DRAWINGS

Reference will now be made by way of example to the accompanying drawings in which like elements are represented by like reference numerals and in which.

DETAILED DESCRIPTION OF THE PREFERRED EMBODIMENTS

One embodiment of the fast scanning stage is shown in FIG. 2. The sample to be scanned is affixed to a sample stage 21 that comprises a generally flat plate of an electrically insulating material such as, for example, a ceramic, a temperature resistant polymer, or anodized aluminum. The sample may be fixed in place with a thermally reversible or soluble adhesive. The stage 21 is affixed to fixed supports 23 using four piezoelectric bending elements (actuators) 22, such as lead zirconate titanate (PZT) elements manufactured by Piezo Systems Inc. of Massachusetts under the designation T220.

The assembly forms a parallelogram scanning element capable of uniform small translations in the direction that corresponds to the bending of the piezoelectric elements. The scanning elements are electrically connected in parallel and driven by a sinusoidal waveform generator 20 at the resonant frequency for translational displacements of the scanning stage. The elevational view in FIG. 2B shows the location of the scanning probe 24 with respect to the scanning stage 21. A transducer 25 controls the height (Z-axis) of the probe 24 with respect to the sample stage 21. At this point, for ease of understanding and clarity, just the fast scan axis is described. The addition of a second slow scan axis can be implemented as will be discussed below.

Figure 3A:
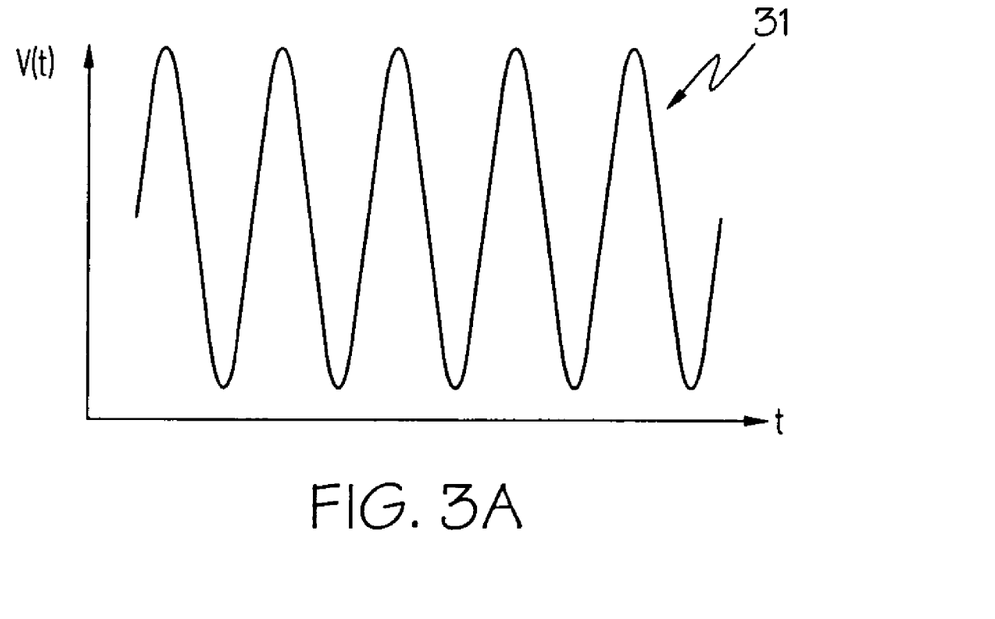
FIG. 3A illustrates a plot of a sinusoidal drive waveform as applied to the scanning element at its resonant frequency.
Figure 3B:
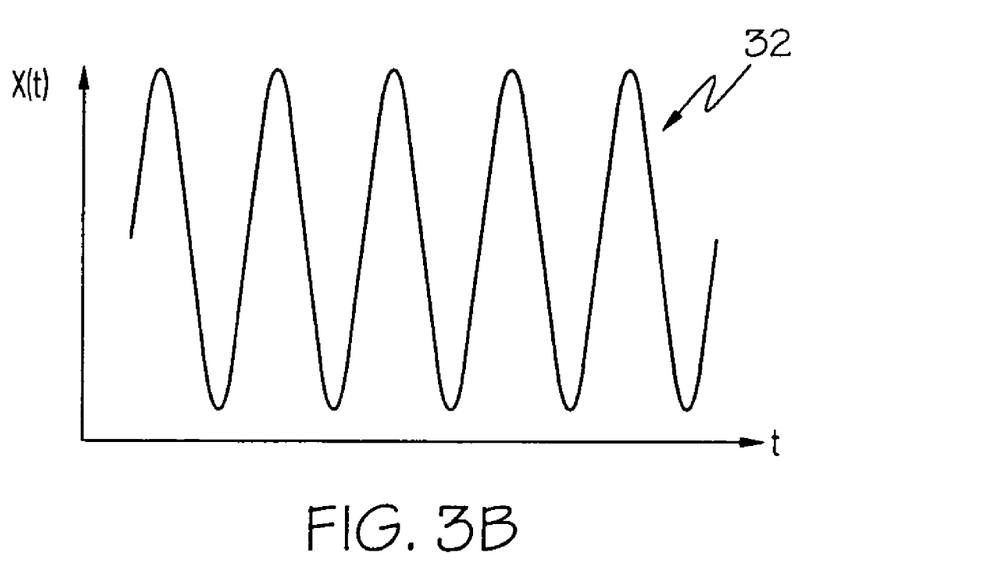
FIG. 3B illustrates a plot of the displacement, X(t), when the scanning element is driven at resonance (the response is phase shifted by 90° with respect to the drive).

One aspect of the present invention provides for the driving of scanning stage 21 at its resonant frequency with a sinusoidal drive waveform 31 as shown in FIG. 3A. If the time dependent driving force is described by $F_0 \sin(\omega t)$, then the response at resonance is given by $$X(t) \approx \frac{QF_0}{K} \sin\left(\omega t + \frac{\pi}{2}\right),$$

where Q is the mechanical Q-factor of the stage and K is the spring constant for bending motion. Thus, the response of the scanning stage is also sinusoidal (32 in FIG. 3B) with no spurious resonance. This is because the derivative of the driving force is a smooth co-sinusoidal function with no impulse applied at the turning points of the raster scan.

Figure 4A:
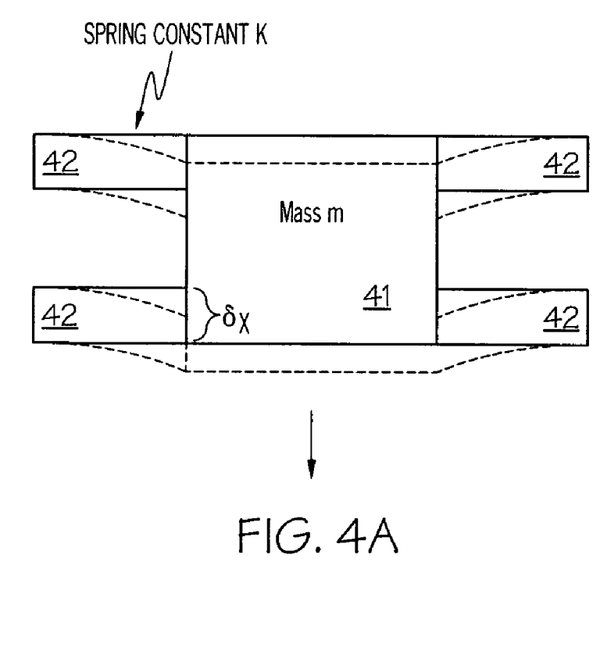
FIG. 4A is a schematic drawing showing the displacement of the four bimorph elements as one embodiment of the scanning stage is driven.

The motion of the scanning stage may be further described by considering the bending displacement of all four piezoelectric bending elements caused by a parallel electrical drive. This is shown schematically in FIG. 4A. The free resonance (undriven) corresponds to motion of the scanning stage 41 against all four of the bending elements or actuators 42. However, when all four bending elements are driven this way, there is no interaction causing acceleration or retardation of one element by any of the others. Thus, the motion is equivalent to the self-resonance of any one bending element 42 attached to a fixed surface 44 at one end (FIG. 4B) and free to move at the other end 45, but loaded with the mass 43 of the sample stage.

Figure 4B:
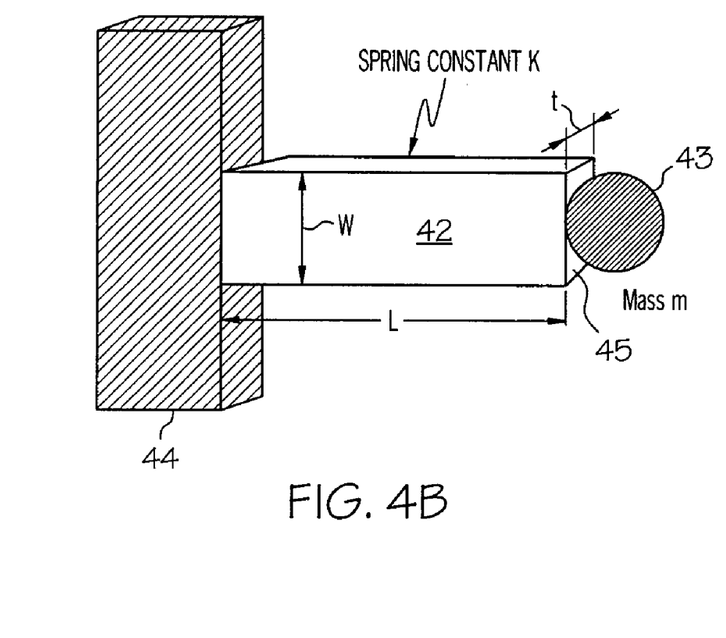
FIG. 4B is a schematic drawing of a simple model for the dynamics of the stage.

In terms of the length L, width w, and thickness t of the illustrated bending element 42 (see FIG. 4B), the self-resonance is given by (Technical Publication TP-237 from Morgan Electro Ceramics)

$$f_r = 0.162 \frac{t}{L^2} \sqrt{\frac{Y_{11}^E}{\rho}}$$

where $Y_{11}^E$ is the bending Young's modulus applied in short circuit conditions and $\rho$ is the material density. For an unloaded bending element (i.e., the sample stage mass m=0), the geometry of the bending element leads to $$f_r = 0.162 \sqrt{\frac{t^3}{L^3} \frac{Y_{11}^E w}{M}} \tag{1}$$

where M is the mass of the bending element.

When the mass of the stage is added, M can be replaced by $\alpha m$ where m is the mass of the stage and $\alpha$ is a factor on the order of unity that reflects the difference between the mass distribution in this simple model and the real mass distribution. Cast in terms of a bending spring constant for the system, $$f_r = 0.162 \sqrt{\frac{K}{\alpha m}} \quad \text{where} \quad K = \frac{wt^3}{L^3} Y_{11}^E. \tag{2}$$

For PZT 5B bimorph materials (Technical Publication TP-237 from Morgan Electro Ceramics), $Y_{11}^E$ is $6 \times 10^{10}$ N/m².

Figure 2A:
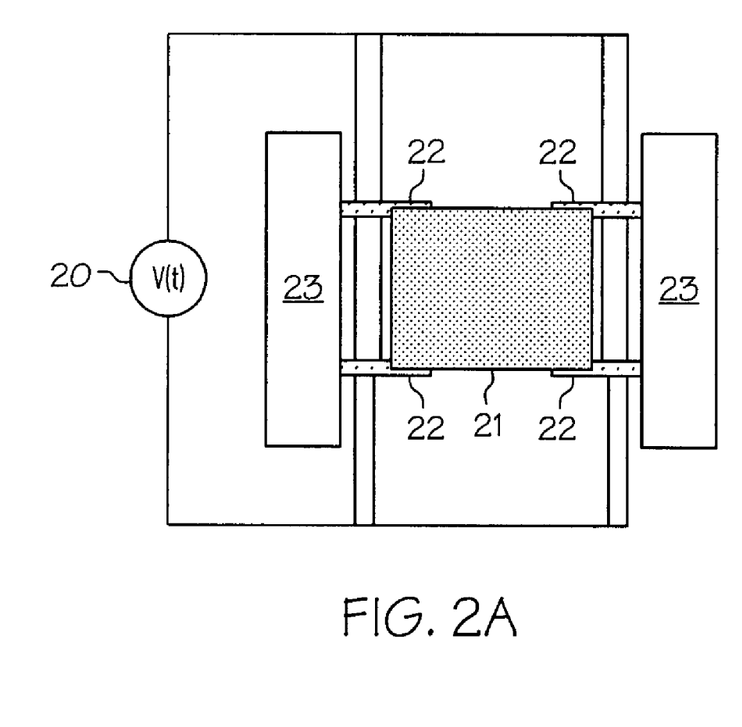
FIG. 2A is a schematic plan view of the fast scanning stage according to one embodiment of the present invention.
Figure 2B:
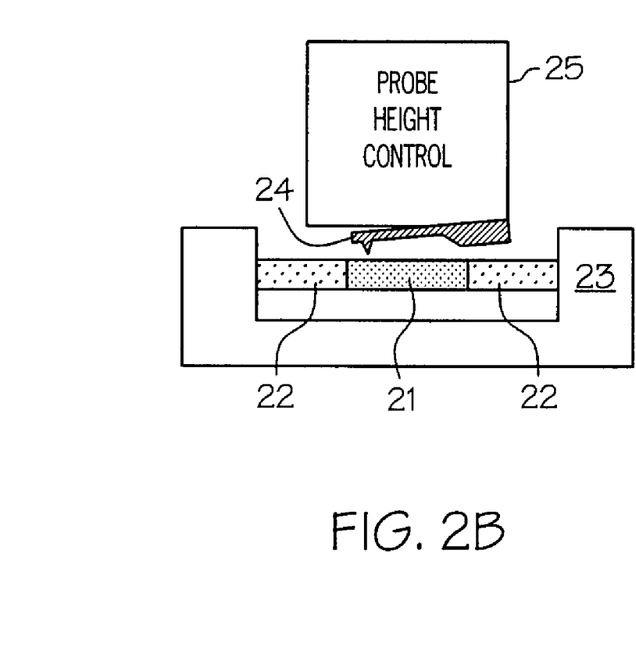
FIG. 2B is a schematic elevational view showing the scanning probe in place.

As an example of a practical implementation of the sample stage shown in FIGS. 2A and B, consider a stage 21 that includes four of the T220 piezoelectric elements 22 manufactured by Piezo Systems Inc. of Massachusetts. The dimensions for these elements are t=0.5 mm and w=1 mm. A convenient length for the free part of each element is 6 mm (though this dimension is easily shortened). A useful sample stage may be made from a 1 cm by 1 cm slab of 1 mm thick anodized aluminum. This sample stage has a mass of 0.26 gm.

Calculating K to be equal to $4 \times 10^4$ N/m, taking $\alpha=1$, and ignoring the mass of the bending element compared to the mass of the stage, Equation 2 predicts $f_r$=2 kHz. A real stage manufactured with these materials is found to have a measured self-resonance for translational motion of 2.8 kHz, so that $\alpha$ is empirically determined to be 0.51. Thus, an empirical relation for the self-resonant frequency is $$f_r = 0.162 \sqrt{\frac{K}{0.51m}} \quad \text{where} \quad K = \frac{wt^3}{L^3} Y_{11}^E \tag{3}$$

and m is the mass of the stage.

The peak displacement amplitude at resonance is equal to Q times the displacement amplitude at low frequency. Because all four bending elements work together, Equation 2 for the free (unloaded) displacement can be used. This is, neglecting a small correction for non-linearity and the thickness of the metal vane incorporated into these bending elements (Technical Publication TP-237 from Morgan Electro Ceramics):

$$d_F = \frac{3}{2} d_{31} \frac{L^2}{t^2} V \tag{4}$$

where $d_{31}$ is the piezoelectric strain coefficient relating transverse strain to the electric field, and V is the applied bias. At resonance, Equation 4 becomes $$d_F^{RES} = Q \frac{3}{2} d_{31} \frac{L^2}{t^2} V \tag{5}$$

where Q is the mechanical Q factor. For a commercial PZT 5B product, $d_{31} = -1.8 \times 10^{-10}$ m/V.

Taking the dimensions used previously (L=6 mm, t=0.5 mm) and calculating, $d_F^{RES} \approx 40$ Q nm/V. The measured Q of a sample stage built with these dimensions was about 2, so that a peak deflection of about 80 nm/volt is expected. Interferometric determination of the actual deflection of the stage yielded a measured sensitivity of about 10 nm/V. This is less than estimated, but satisfactory, permitting a scan of 1 micron with an applied bias of 100V.

Figure 5A:
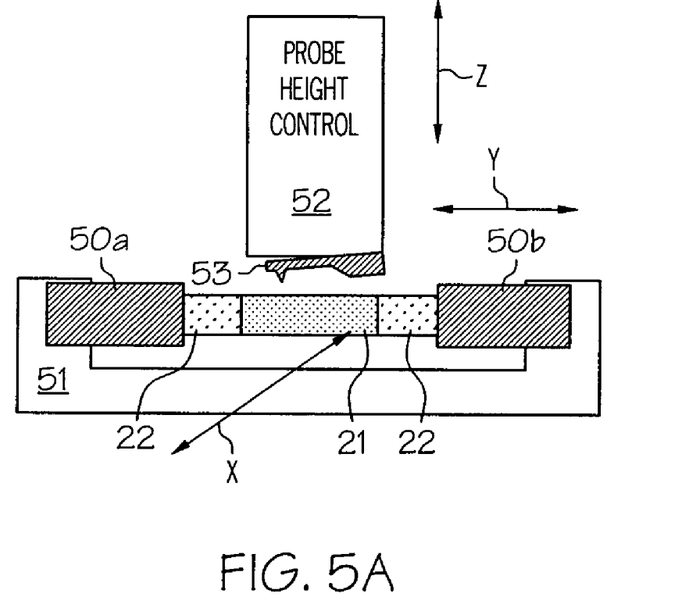
FIG. 5A is a schematic drawing showing a combination of one embodiment of the fast scan stage with PZT stacks to achieve X-Y raster scanning.

The sample stage can be incorporated into an existing atomic force microscope (AFM) in a number of ways, one of which is shown in FIG. 5A. Here, the sample stage is modified by the addition of PZT stack bending elements 50 such as, for example, elements commercially available under the designation AD0203D04 from Tokin of Tokyo, Japan. These elements serve to translate the entire stage in a direction normal to the fast scan axis. To accomplish this, one stack of bending elements, e.g., 50a is expanded as the other stack, e.g., 50b is contracted. Because the scan in the Y direction is slower than that in the X-direction by a factor equal to the number of lines scanned per frame, these stacks may be driven in a conventional manner to achieve a displacement that is a linear function of time. The ends of the stack elements 50 are mounted to a rigid frame 51. The sample (not shown) is placed on scanning stage 21 and raster scanned under the force sensing cantilever probe 53. The probe is in turn, positioned by a Z-axis actuator 52 that can move the probe along a vertical axis as shown.

In order to realize the full potential of the fast scan stage, small cantilevers and fast servo control mechanisms such as those described by Ando et al, supra, should be used. However, existing AFMs can operate with conventional cantilevers that resonate in water at as high as 50 kHz with a spring constant of a few N/m. Thus, acquiring 100 data points in the X-axis direction and sampling once each oscillation period, a fast scanning stage resonant frequency of 500 Hz is appropriate. With 100 lines per image, data can be acquired at 5 frames per second. While this is less than a standard video rate, it represents a significant increase in speed over existing instruments.

Figure 5B:
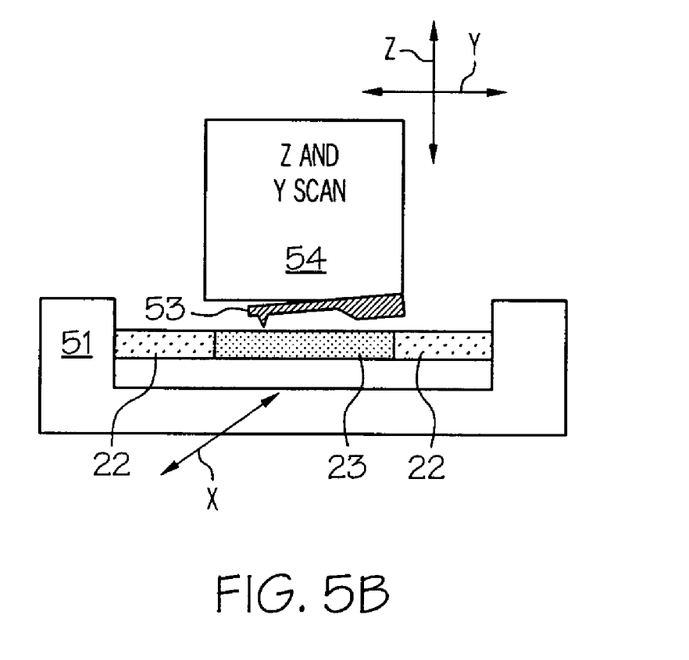
FIG. 5B is a schematic drawing showing one embodiment of the fast-scan stage combined with a conventional tube scanning element to obtain X-Y raster scanning.

In another embodiment, the fast scan axis of a conventional AFM (FIG. 5B) is simply turned off, and the fast scan stage is positioned under the probe. The probe is then moved only in the slow-scan (Y) and height (Z) directions by the existing scanner 54, the X-axis motion being generated by the fast-scan stage 22, 23. This embodiment represents one very simple method of obtaining significant speed enhancements using the fast scan sample stage of the present invention retrofitted onto a conventional (slow) AFM. Excellent results can be obtained by using a slow height servo response to control the overall position of the probe while collecting raw deflection (or amplitude) data to record local changes in topography at a fast rate.

In order to realize the full potential of the fast scan stage of the present invention, it should be incorporated into an instrument that uses diffraction limited optics to detect the signal from a small probe such as the instrument described by Ando et al, supra.

The resonant scanning stage has the disadvantage that, because the scan is non-linear, data acquired at equal intervals in time will not correspond to equal intervals in displacement. However, this problem is well known and is solved by the use of algorithms that process the data after acquisition. Lindsay and Jing, U.S. Pat. No. 5,805,448, the disclosure of which is hereby incorporated by reference, describe these methods and algorithms.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A fast scanning stage for a scanning probe microscope, said scanning probe microscope including a probe, said fast scanning stage comprising, a fixed support, and a sample stage having at least one axis of translation, said sample stage being affixed to said fixed support by means for causing displacement of said sample stage relative to said probe, wherein said means for causing displacement comprises actuator elements coupled to said fixed support and said sample stage and wherein said means for causing displacement is responsive to the application of a bias voltage of 100 volts or less and wherein said scanning probe microscope is a fast atomic force microscope (AFM) with a scanning stage resonance frequency between about 500 Hz to about 5 kHz.

2. A fast-axis scanning stage as claimed in claim 1, in which said sample stage is comprised of a material selected from the group consisting of ceramics, heat resistant polymers, and anodized aluminum.

3. A fast scanning stage for a scanning probe microscope, said scanning probe microscope including a probe, said fast scanning stage comprising a fixed support and a sample stage having at least one axis of translation, said sample stage being affixed to said fixed support by means for causing displacement of said sample stage relative to said probe, and in which said means for causing displacement of said sample comprises actuator elements coupled to said fixed support and said sample stage and a sine waveform generator for actuating said actuator elements through the application of a bias voltage of 100 volts or less, wherein said scanning probe microscope is a fast atomic force microscope (AFM) with a scanning stage resonance frequency between about 500 Hz to about 5 kHz.

4. A fast scanning stage as claimed in claim 3, in which said means for causing displacement of said sample stage comprise four actuator elements supporting said sample stage.

5. A fast-axis scanning stage as claimed in claim 4, in which at least one of said actuator elements comprises a PZT bimorph.

6. A fast scanning stage as claimed in claim 3, in which at least one of said actuator elements comprises a stack bending element.

7. A fast-axis scanning stage as claimed in claim 3, in which at least one of said actuator elements comprises a PZT bimorph.

8. A fast scanning stage for a scanning probe microscope, said scanning probe microscope including a probe, said fast scanning stage comprising a fixed support and a sample stage having at least one axis of translation, said sample stage being affixed to said fixed support by actuator elements coupled to said fixed support and said sample stage, a sine waveform generator for actuating said actuator elements, in which said sample stage is displaced by said actuator elements being driven at the frequency of resonant vibration through the application of a bias voltage of 100 volts or less corresponding to translation of said sample stage with respect to said probe, wherein said scanning probe microscope is a fast atomic force microscope (AFM) with a scanning stage resonance frequency between about 500 Hz to about 5 kHz.

9. A fast scanning stage as claimed in claim 8 in which said sample stage has a square or rectangular configuration and each corner of said sample stage is supported by one of said actuator elements.

10. A fast scanning stage as claimed in claim 9, in which said actuator elements form a parallelogram scanning element.

11. A fast scanning stage as claimed in claim 10, in which said actuator elements are connected electrically in parallel.

12. A scanning probe microscope including a probe and a fast scanning stage, said fast scanning stage comprising a fixed support, and a sample stage having at least one axis of translation, said sample stage being affixed to said fixed support by actuator elements coupled to said fixed support and said sample stage and supporting said sample stage to cause displacement of said sample stage relative to said probe through the application of a bias voltage of 100 volts or less, wherein said scanning probe microscope is a fast atomic force microscope (AFM) with a scanning stage resonance frequency between about 500 Hz to about 5 kHz.

13. A method of operating a fast scanning stage for a scanning probe microscope, said scanning probe microscope including a probe, said method comprising, providing a sample stage having a sample thereon and causing displacement of said sample on said sample stage relative to said probe by actuating actuator elements coupled to said sample stage and a fixed support, wherein said actuator elements drive said sample stage at the resonant frequency of said sample stage using a sine waveform generator through the application of a bias voltage of 100 volts or less, wherein said scanning probe microscope is a fast atomic force microscope (AFM) with a scanning stage resonance frequency between about 500 Hz to about 5 kHz.

14. A method as claimed in claim 13, in which the resonant frequency of said sample stage is about $1/100^{th}$ that of the resonant frequency of said probe.

* * * * *